United States Patent
Lapin et al.

(10) Patent No.: US 11,406,935 B1
(45) Date of Patent: Aug. 9, 2022

(54) METHODS AND APPARATUS FOR THE MITIGATION OF $H_2S$ AND OTHER PARAMETERS IN WASTEWATER TREATMENT

(71) Applicants: Dennis Lapin, Orlando, FL (US); Brad McMahen, Orlando, FL (US)

(72) Inventors: Dennis Lapin, Orlando, FL (US); Brad McMahen, Orlando, FL (US)

(73) Assignee: Lapin Environmental, LLC, Orlando, FL (US)

( * ) Notice: Subject to any disclaimer, the term of this patent is extended or adjusted under 35 U.S.C. 154(b) by 498 days.

(21) Appl. No.: 16/422,390

(22) Filed: May 24, 2019

Related U.S. Application Data

(63) Continuation-in-part of application No. 15/837,485, filed on Dec. 11, 2017, now abandoned.

(60) Provisional application No. 62/432,250, filed on Dec. 9, 2016.

(51) Int. Cl.
| | | |
|---|---|---|
| *B01D 53/52* | (2006.01) | |
| *B01D 53/78* | (2006.01) | |
| *B01D 53/79* | (2006.01) | |
| *C02F 1/72* | (2006.01) | |
| *C02F 101/10* | (2006.01) | |

(52) U.S. Cl.
CPC .............. *B01D 53/52* (2013.01); *B01D 53/78* (2013.01); *B01D 53/79* (2013.01); *B01D 2251/102* (2013.01); *B01D 2251/106* (2013.01); *B01D 2251/108* (2013.01); *C02F 1/72* (2013.01); *C02F 2101/101* (2013.01); *C02F 2303/02* (2013.01)

(58) Field of Classification Search
CPC ... A61L 9/00; A61L 9/015; A61L 9/14; A61L 9/145; A61L 2209/10; A61L 2209/21; A61L 2209/211; A61L 2209/212; A61L 2209/22; B01D 53/1468; B01D 53/52; B01D 53/78; B01D 2257/304; B01D 2258/06; B01D 53/79; B01D 2251/102; B01D 2251/106; B01D 2251/108; C02F 1/722; C02F 1/727; C02F 1/74; C02F 2101/101; C02F 2303/02; C02F 1/72
See application file for complete search history.

(56) References Cited

U.S. PATENT DOCUMENTS

| | | | |
|---|---|---|---|
| 3,779,913 A | 12/1973 | Martin | |
| 4,235,719 A | 11/1980 | Pearson | |
| 4,550,010 A * | 10/1985 | Chelu | B01D 53/34 422/120 |
| 5,616,241 A | 4/1997 | Khudenko | |
| 5,624,562 A | 4/1997 | Scroggins | |
| 5,989,428 A | 11/1999 | Goronszy | |
| 6,645,450 B2 * | 11/2003 | Stoltz | A61L 9/145 423/245.2 |
| 7,105,039 B2 * | 9/2006 | Decker | B01D 53/14 95/187 |
| 9,463,991 B2 | 10/2016 | Lapin et al. | |
| 2001/0043898 A1 * | 11/2001 | Stoltz | B01D 53/86 423/245.2 |
| 2003/0188695 A1 | 10/2003 | Robohm | |
| 2006/0175263 A1 | 8/2006 | Rice et al. | |
| 2006/0243664 A1 | 11/2006 | Pollock | |
| 2007/0039878 A1 | 2/2007 | Roberts et al. | |
| 2010/0158750 A1 * | 6/2010 | Koh | A61L 9/015 422/4 |
| 2011/0156290 A1 | 6/2011 | Wensloff | |
| 2011/0272831 A1 | 11/2011 | Pearson et al. | |
| 2020/0140298 A1 * | 5/2020 | Archer, III | B01D 53/96 |

FOREIGN PATENT DOCUMENTS

KR   2005 091 433 A  *  9/2005  ............ A61L 11/00

* cited by examiner

Primary Examiner — Timothy C Vanoy
(74) Attorney, Agent, or Firm — Larry D. Johnson

(57) ABSTRACT

Hydrogen sulfide, mercaptans, corrosion and odor are treated through either a single phase gas treatment, a single phase liquid treatment or a multiphase (liquid and gas) treatment via an application of a gas infused liquid, oxidizing agents, and/or liquid bacterial formulations within a structure or within an external treatment chamber or pipe. An apparatus for treatment of an exhaust gas specifically to mitigate or eliminate H2S, mercaptans, corrosion, and odor includes means for introducing an oxidizing liquid, an oxidizing gas, or an oxidizing gas and liquid into an external treatment chamber or pipe whereby the introduced agent interacts with the exhaust gas to mitigate or eliminate its effect.

20 Claims, 6 Drawing Sheets

METHODS AND APPARATUS FOR THE MITIGATION OF $H_2S$ AND OTHER PARAMETERS IN WASTEWATER TREATMENT

CROSS REFERENCE TO RELATED APPLICATIONS

The present application is a continuation-in-part of copending application Ser. No. 15/837,485, filed Dec. 11, 2017, which claims the benefit of the filing date of U.S. Provisional Patent Application Ser. No. 62/432,250, filed Dec. 9, 2016. The foregoing applications are incorporated by reference in their entirety as if fully set forth herein.

TECHNICAL FIELD

This written description relates generally to the treatment of wastewater, and more particularly to improved methods and apparatus for the mitigation of hydrogen sulfide and other parameters that may be encountered in a wastewater treatment structure during the collection and treatment of wastewater. These parameters include gases that may be referred to as odorous, problematic, contaminated, impure, polluted, or the like.

BACKGROUND INFORMATION AND DISCUSSION OF RELATED ART

Hydrogen sulfide ($H_2S$) and mercaptans result from anaerobic conditions in the collection and treatment of wastewater. These products are typically first identified by their unpleasant odors, and ultimately may cause corrosion of equipment and structures. $H_2S$ has long been recognized as a major problem for municipal wastewater and septage systems, and originates from the biological reduction of sulfates and the decomposition of organic material. $H_2S$ is found in liquid wastewater solution as well as in the gasses released from the liquid wastewater. $H_2S$ forms at virtually every point in a system from gravity pipes, force mains, lift stations, holding tanks, processing tanks, and dewatering equipment. Beyond its nuisance odor, $H_2S$ may cause corrosion requiring costly rehabilitation efforts, as well as potential health related issues.

The current industry typically implements gas phase treatment of $H_2S$ by biological or chemical scrubbing, or by treating the gases directly via ozone or ultraviolet (UV) producing units. These options involve high maintenance equipment and the application of ozone, an Environmental Protection Agency (EPA) listed hazardous material.

Liquid phase treatment of $H_2S$ is typically implemented by means of injecting oxidizing chemicals into a wastewater liquid column within a basin or "wet well". Chemicals used by the industry are typically deemed hazardous by the EPA, and many leave an undesirable residual. This residual may create scaling in pipes and equipment, as well as loading the receiving treatment facility with additional undesirable chemical byproducts.

SUMMARY

Described below are methods and apparatus for the mitigation of hydrogen sulfide and other parameters in wastewater treatment. Particular embodiments of the subject matter described in this specification can be implemented so as to realize one or more of the following advantages.

In some implementations, the method and apparatus provides vapor treatment of H2S, methane, mercaptans, or other odorous, hazardous, or corrosive gases or other problematic gases, and problematic air quality usually generated within wastewater collection and treatment systems or other industry streams.

In some implementations, the method and apparatus provides treatment via pre-mixing or pre-blending an oxidizing gas, a neutralizing gas, or both, with a liquid prior to releasing that mix or blend into a treatment chamber. In some implementations, the treatment chamber may be either under pressure, under vacuum, or ambient.

In some implementations, the method and apparatus provides treatment by merging, premixing, or otherwise co-mingling a gas and a liquid prior to releasing it into a headspace, chamber, or any enclosed space or contained area available for treatment.

In some implementations, the method and apparatus provides treatment by releasing an oxidizing gas, a neutralizing gas, or both, along with a liquid, into a treatment chamber in which the chamber is either under pressure, under vacuum, or ambient.

In some implementations, the method and apparatus provides treatment by releasing the gas and liquid components intermittently, simultaneously, randomly, or in alternating order.

In some implementations, the method and apparatus provides treatment by atomizing or misting co-mingled, pre-mixed, or pre-blended oxidizing or neutralizing gas or gases and liquid within the treatment chamber. In other implementations, the method and apparatus provides treatment by simultaneously releasing the oxidizing or neutralizing gas or gases, and atomized or misted liquid, and mixing or blending them within the treatment chamber. In other implementations, the method and apparatus provides treatment by creating a liquid column of the mix or blend within the treatment chamber for the problematic gases to pass through by diffusion or some other method.

In some implementations, the method and apparatus performs pre-mixing or pre-blending at some time prior to being released within the treatment chamber. In other implementations, the treatment chamber may become the mixing or blending zone if the oxidizing or neutralizing gas, or gases, and atomized misted liquid are released simultaneously into the chamber for mixing or blending.

In some implementations, pre-mixing, or pre-blending, or simultaneous release, is in lieu of the combinations being infused prior to release into the chamber.

In some implementations, the method and apparatus uses a liquid, made up of either one or more chemicals, and/or one or more natural liquid products, to neutralize or oxidize the problematic gases in lieu of a liquid gaseous mix or blend. In some implementations, the liquid is in the form of a column of liquid for the problematic gases to pass through by diffusion or some other method. In other implementations, the liquid is atomized or misted within the treatment chamber to accomplish the treatment by interfacing the problem gas or gases with the atomized, misted, or in any other way suspended or curtained liquid being one or more chemical, and/or one or more natural liquid products.

In some implementations, the natural liquid product may include at least one of peat, charcoal, or histosol.

In some implementations, the method and apparatus first interfaces the oxidizing or neutralizing gas with the problematic gas or gases and then sends that mix through a liquid column by diffusion or other method or sending it through a curtain of atomized, misted, or sprayed liquid of choice.

In some implementations, the method and apparatus provides a liquid column that is not pre-infused with O2, but rather the O2 gas or another oxidant is introduced into the exhaust gas stream of the H2S and then diffused through the liquid, such that pretreatment happens before diffusion and the liquid captures the sulfides.

In some implementations, the method and apparatus provides a polishing atomized mix after diffusion through the liquid column.

In some implementations, the gas and liquid components are comingled, mixed, or blended prior to release into the treatment chamber.

In some implementations, the method and apparatus provides atomizing of other oxidants such as chlorine or other neutralizing agents.

In some implementations, the method and apparatus provides a column of liquid oxidants which may include at least one of hypochlorite, peroxide, or other oxidizing agents.

In some implementations, these methods may be stand-alone. In other implementations, these methods may be combined.

In some implementations, mitigation of hydrogen sulfide, mercaptans, corrosion and odor is achieved through either a single phase gas treatment or a multiphase (liquid and gas) treatment via an application of a gas infused liquid, or an aerated oxidizing liquid within a structure or within an external treatment chamber or pipe.

In some implementations, an apparatus is provided for treatment of an exhaust gas specifically to mitigate or eliminate H2S, mercaptans, corrosion, and odor by introducing an oxidizing gas, or an oxidizing liquid, or an oxidizing gas and liquid, or an oxidizing gas infused liquid, into an external treatment chamber or pipe whereby the oxidizing gas, or the oxidizing liquid, or the oxidizing gas and liquid, or the oxidizing gas infused liquid interacts with the exhaust gas to mitigate or eliminate its effect.

In some implementations, both gas and liquid phases of H2S are treated simultaneously. In other implementations, each phase is treated independently. The phase (gas, liquid, or both) of treatment chosen can be based on the need of the specific application or project. For example, there may be a wastewater pump station that gas phase treatment is desired if corrosion resistant infrastructure is in place and the exterior is in a neighborhood and sensitive to odor and external components are subject to corrosion. A liquid phase application may be desired if a wastewater pump station is in a rural area and not sensitive to odorous gases escaping, although the local and downstream infrastructure is susceptible to corrosion.

In some implementations, odorous and corrosive wastewater byproducts (H2S, mercaptans, or other) are treated by delivering an oxygen enriched liquid to address the anaerobic conditions. The liquid can be enriched via oxygen infusion, diffused aeration, bubbled aeration (micro bubble, nano bubble, or any variation of bubble size), vacuum infusion, or the liquid can contain other oxidizing agents such as hypochlorite, hydroxide, or pure oxygen. For gas phase treatment, the oxygen enriched solution may be delivered into a structure headspace (the air above the liquid column within a closed system) and/or the headspace volume may be vented into an external treatment chamber for treatment or final polishing. The oxidation may take place in the wet well/basin headspace or in the external treatment chamber where an engineered misting system atomizes the oxygen enriched liquid for the gases to pass and interact.

Gas phase treatment may also be accomplished within a vent, duct, or piping system where the gases are conveyed through the atomized mist, a curtain, a liquid column, or any density variation of oxygen enriched liquid, oxidizing agents, or bacterial formulations. In some implementations, any remaining residual carrier fluids can be collected and recirculated as oxidizing carrier liquid to provide an efficient closed loop system. In other implementations, the carrier liquid can be discharged when needed and where collection of the liquid is not desired.

For liquid phase treatment, the oxygen enriched liquid can also be conveyed by a nozzle, applicator, or diffuser directly to the wastewater liquid column of a wet well/basin. The liquid phase treatment can also occur within a wastewater piping collection or transmission system that is used to convey wastewater. This can be accomplished by directly injecting solution into the piping system. The liquid solution may be either an oxygen enriched liquid or a liquid bacterial solution or a combination of the solutions. Liquid phase treatment can occur simultaneously with the gas phase or independently.

In some implementations, the apparatus can receive an odorous gas and treat it within an external chamber, or pipe, or within any external structure, or within the odorous environment itself (e.g., any wastewater treatment structure such as a wastewater wet well, headworks, or basin), whether or not any of these are under pressure, vacuum, or ambient conditions.

The details of one or more embodiments of the subject matter described in this specification are set forth in the accompanying drawings and the description below. Other features, aspects, and advantages of the subject matter will become apparent from the description, the drawings, and the claims.

Those skilled in the art will appreciate that the conception upon which this disclosure is based readily may be utilized as a basis for the designing of other structures, methods and systems that include one or more of the various features described below.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION

Figure 1:
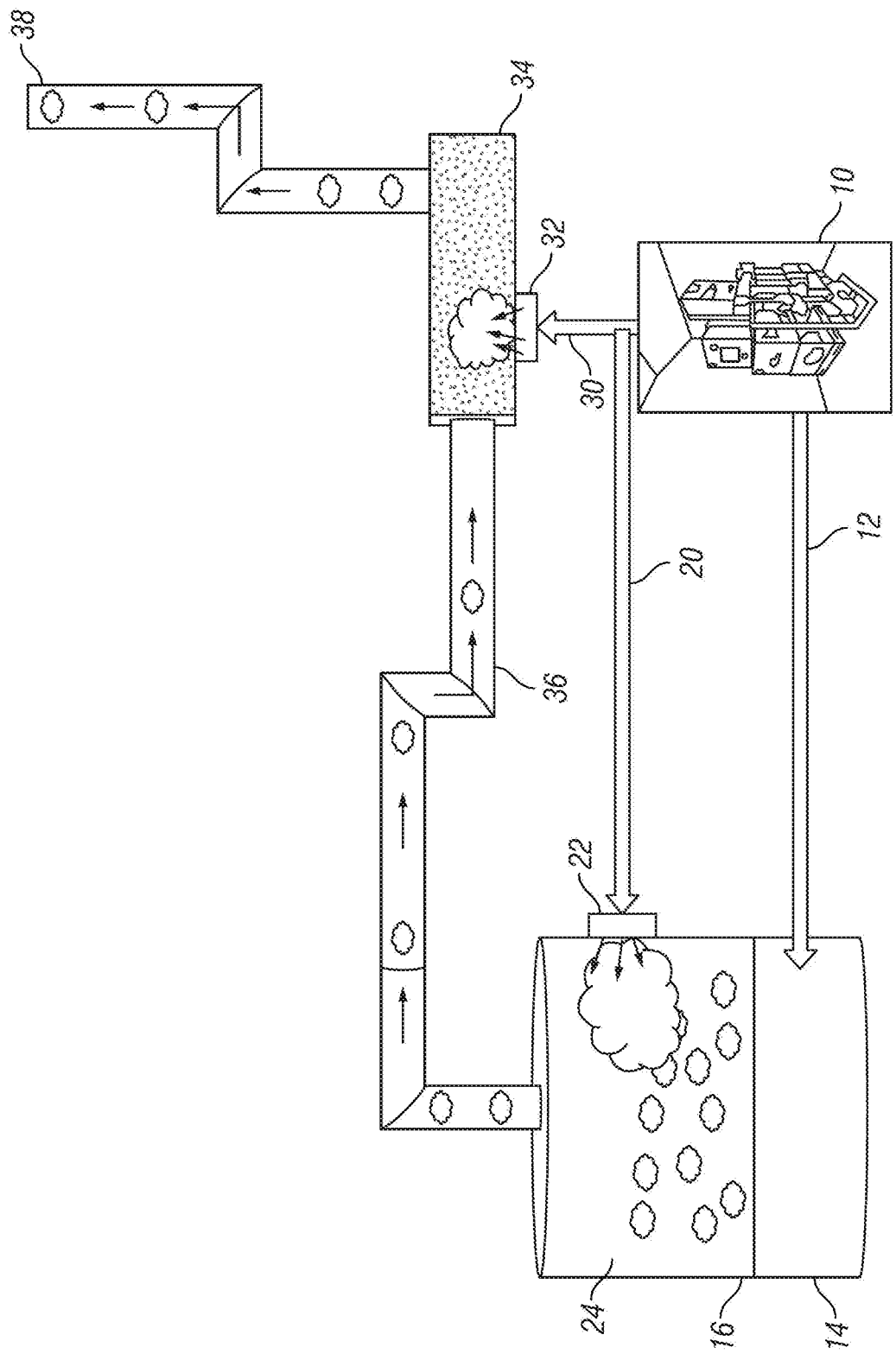
FIG. 1 is a schematic view of both gas and liquid phase treatment via an oxygen infused liquid.

Referring to FIGS. 1 through 6, wherein like reference numerals refer to like components in the various views, there is illustrated therein methods and apparatus for the mitigation of hydrogen sulfide and other parameters in wastewater treatment.

FIG. 1 is a schematic view of both gas and liquid phase treatment via an oxygen infused liquid. Both liquid and gas phases of wastewater generated byproducts are treated in place as well as with an external interface structure. The three treatment points can be treated simultaneously or individually. The orientation, scale, and configurations are unlimited.

For example, gas phase treatment can be achieved by infusing an oxidizing gas into a liquid and then mist, fog, or spray the gas infused liquid into the headspace in a wet well/basin, and/or a treatment chamber large enough to mitigate or eliminate the odorous gas. The gas to mitigate can be any oxidizing gas (e.g., oxygen, ozone) and the liquid could be any liquid (e.g., water, hypochlorite, peroxide). The chamber can be horizontal, vertical, or any configuration and should be sized appropriately for the volume of flow that needs treating. An example could be a 20 cubic foot treatment chamber but not limited to that size. The oxygen infused liquid is misted throughout the chamber and as the odorous gases pass through the oxygen mist filled chamber they are mitigated or eliminated.

In the system illustrated in FIG. 1, oxygen infused liquid is generated at oxygen processing unit 10, and delivered by piping 12 to the liquid column 14 in a wet well/basin 16. Alternatively or additionally, oxygen infused liquid is delivered by piping 20 to an atomization device 22 where it is atomized into the headspace 24 of the wet well/basin 16 to treat the gas phase therein. Additionally or alternatively, oxygen infused liquid is delivered by piping 30 to an atomization device 32 where it is atomized into an external chamber 34 to treat the headspace gasses passively delivered or fan induced from the wet well/basin 16 through piping 36. An example would be the oxygen in the oxygen infused liquid reacts with the H2S to yield $2H_2S+O2 \rightarrow 2H_2O+2S$, which exits the system as treated exhaust at vent 38.

As an example of a successful application, an oxygen infused liquid supply is currently being provided to a wastewater column within a wastewater pump station at a municipal utility. The oxygen infused liquid supply is created with a liquid oxygen supply and an onsite liquid source which are combined in an engineered oxygenator and pressure vessel with automated controls (specifically a Blissfield PrO2 unit). This oxygen infused liquid is delivered to the oxygen deprived wastewater liquid column by means of injection nozzles that are at a controlled depth and location within the wastewater pump station. The system simultaneously directs the oxygen infused liquid supply through an engineered fogging/misting system providing treatment to the headspace that exists above the liquid within the enclosed wet well. The fogging/misting system allows the denser oxygen infused liquid to envelop the existing $H_2S$ gas providing treatment and settlement of the encapsulated gases into the liquid solution. The encapsulated gases are pulled into the wet well liquid column for additional treatment.

The liquid source and oxygen are combined in a vessel under a specific pressure which is appropriate for the application (e.g., approximately 200 psi in some applications). A supersaturated oxidized liquid is formed and delivered from the pressure vessel through piping at a controlled feed rate and nozzle array. The oxygen infused liquid supply provides H2S reduction as well as reducing final treatment requirements downstream by increasing the dissolved oxygen levels in the wastewater. This ultimately results in a reduction of odors, corrosion, energy usage, chemicals, and associated environmental impacts.

Another example uses the same oxygen infused liquid supply and applies it to an external treatment chamber to successfully treat the H2S gas in an odorous wet well application. The oxygen infused liquid supply is directed to the external treatment chamber through an engineered fogging/misting system to provide treatment to the headspace that exists within the chamber. The fogging/misting system allows the denser oxygen infused liquid to envelop the existing $H_2S$ gas providing the treatment and eliminating the H2S gas and odor.

Figure 2:
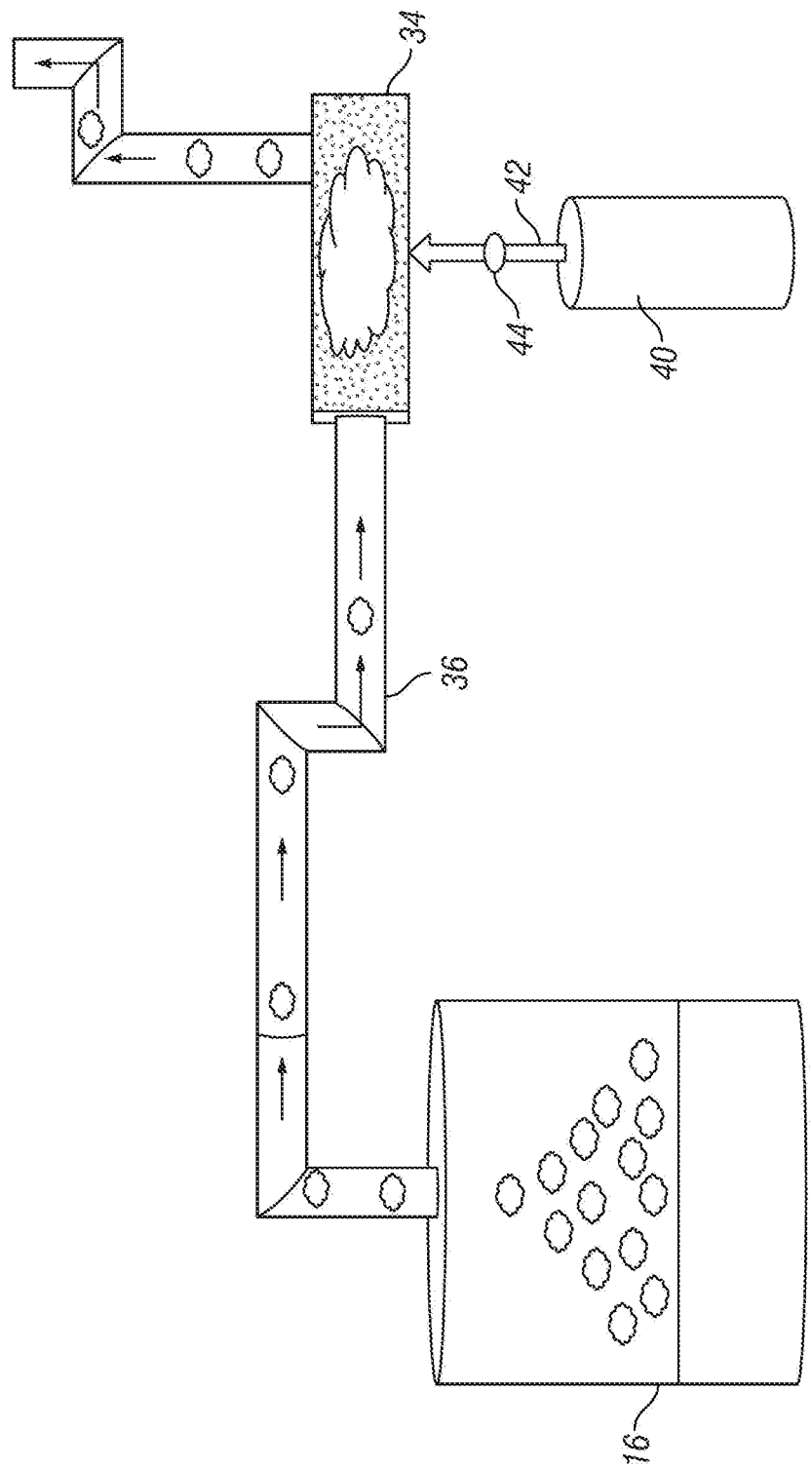
FIG. 2 is a schematic view of external gas phase treatment via a gaseous oxidizing agent.

FIG. 2 is a schematic view of external gas phase treatment via a gaseous oxidizing agent (e.g., pure oxygen or ozone). This method of treatment directs the vented odorous gas into a treatment chamber where an oxidizing gas is introduced and wherein the odorous gas is interfaced and mitigated or eliminated. This chamber can be open or valved, baffled or membrane enhanced as needed to achieve back pressure or containment for treatment. In the system illustrated in FIG. 2, gaseous oxidant is generated at oxidant source 40, and delivered by piping 42 through regulator 44 to external chamber 34 to treat the vented headspace gasses passively delivered or fan induced from the wet well/basin 16 through piping 36.

Figure 3:
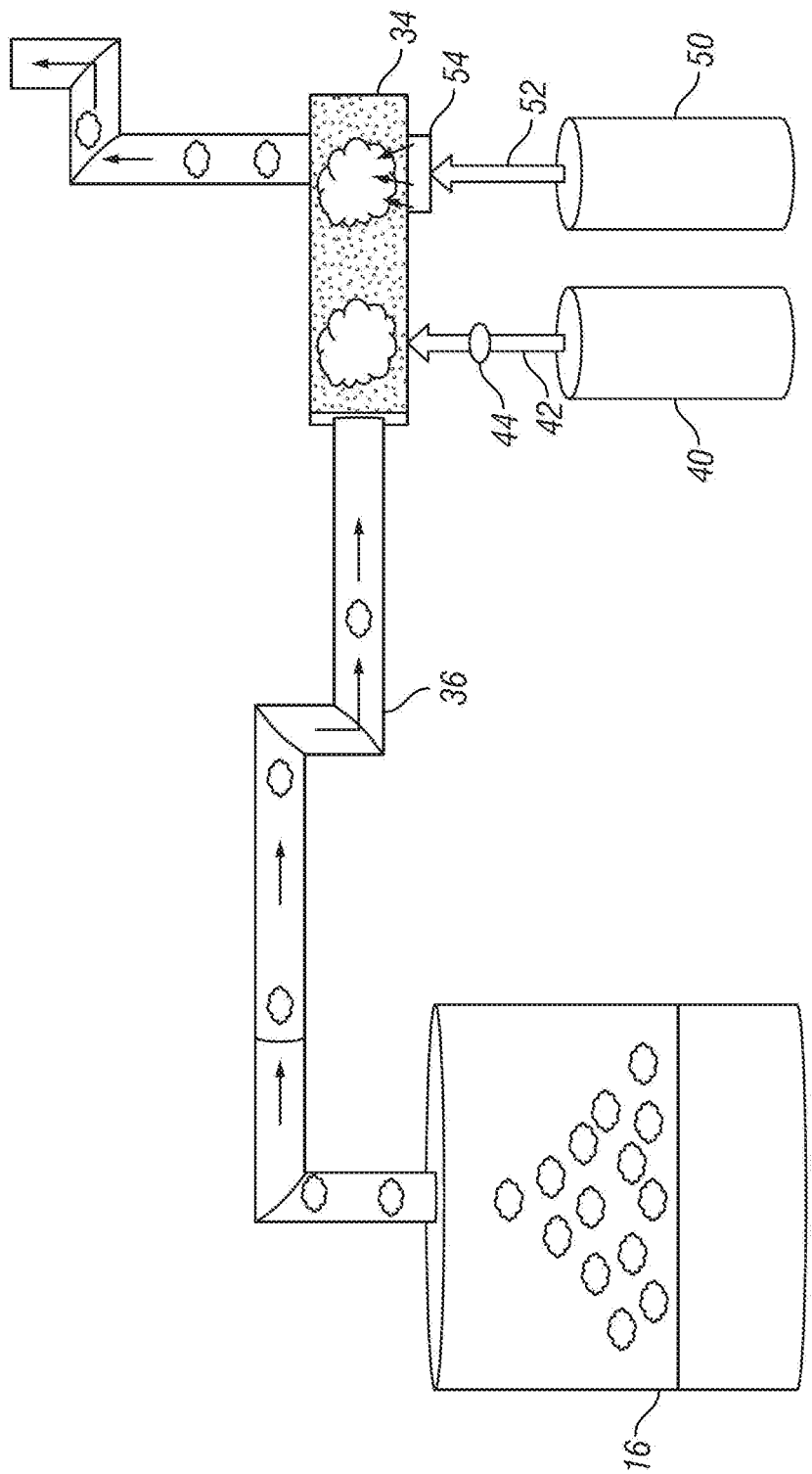
FIG. 3 is a schematic view of external gas phase treatment via a gaseous oxidizing agent with a liquid vapor curtain.

FIG. 3 is a schematic view of external gas phase treatment via a gaseous oxidizing agent with a liquid vapor curtain. This method of treatment mixes or otherwise commingles the oxidizing gas and liquid streams within the chamber itself wherein the density of the liquid mist, along with the oxidizing gas, interfaces and interacts with the passing odorous gases allowing for the treatment. The chamber can be horizontal, vertical, or any configuration and either open or multi-chambered using a baffled wall, pipe, or membrane. If baffled the oxygen gas could be introduced within the first chamber and the liquid misting introduced into the second chamber where it acts as a secondary mixing zone within its dense curtain. The liquid can either be recycled for reuse or simply discharged.

In the system illustrated in FIG. 3, gaseous oxidant is generated at oxidant source 40, and delivered by piping 42 through regulator 44 to external chamber 34. Non-oxidizing liquid is provided from liquid supply 50 and delivered by piping 52 to an atomization device 54 where it is atomized into the external chamber 34 and mixes with the gaseous oxidant to treat the headspace gasses passively delivered or fan induced from the wet well/basin 16 through piping 36.

Figure 4:
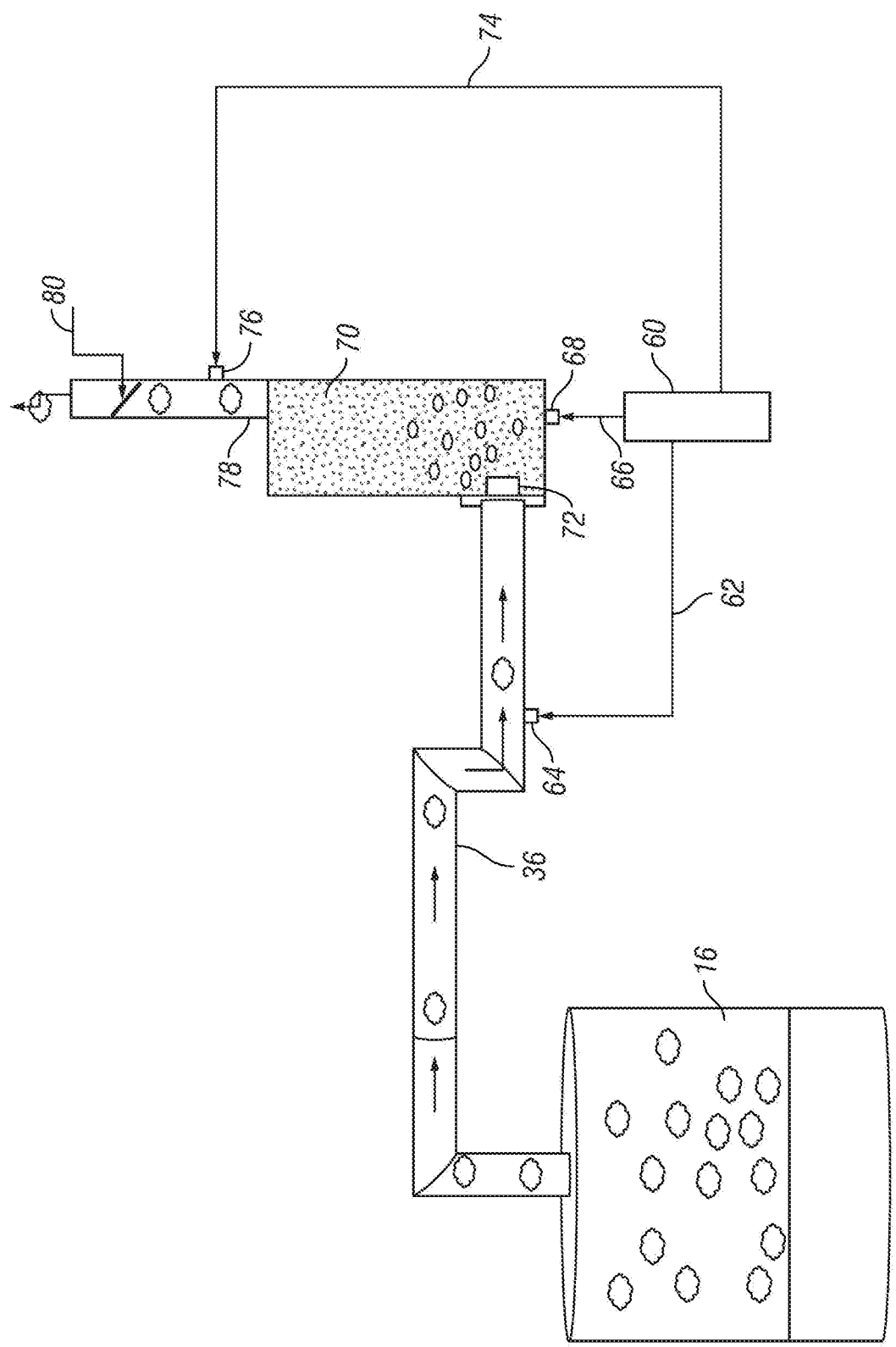
FIG. 4 is a schematic view of contaminated air treatment via an oxidizing, neutralizing, or treatment agent through a liquid interface or atomization.

FIG. 4 is a schematic view of contaminated air treatment via an oxidizing, neutralizing, or treatment agent through a liquid interface or atomization. In the system illustrated in FIG. 4, an oxidizing agent (e.g., pure oxygen, hypochlorite), or treatment agent (e.g., charcoal, histosol) is supplied at source 60, and may be delivered by piping 62 through nozzle or atomization device 64 (depending on whether the oxidizing or treatment agent is a gas or liquid) to treat the exiting headspace gasses passively delivered or fan induced from the wet well/basin 16 through piping 36. Additionally or alternatively, the oxidizing agent, neutralizing agent or treatment agent from source 60 and may be delivered by piping 66 through nozzle or atomization device 68 to treat the exiting headspace gasses passively delivered or fan induced from the wet well/basin 16 through piping 36 and introduced into a liquid column in external chamber/interface 70 via diffusers 72. The liquid level in interface 70 can vary, alternatively, the interface may be void of liquid and used instead for atomization of the oxidizing, neutralizing, or treatment agent delivered from source 60. Additionally or alternatively, the oxidizing agent, neutralizing agent or treatment agent from source 60 may be delivered through piping 74 through nozzle or atomization device 76 to further treat the exhaust gasses exiting from the interface 70 through piping 78. Throttling device 80, such as a valve, orifice, or other flow restricting device, may be used to control the chamber pressure in interface 70 as appropriate. Throttling devices allow control of retention time and pressure. One benefit of controlling pressure is that it promotes saturation and efficient use of the oxidant.

In some implementations, this method of treatment forces the odorous H2S gas through a vessel having a liquid column of oxygen infused liquid. In this case the oxygen infused liquid column may be provided by the Blissfield PrO2 system, but any oxidized solution can be used as long as it meets the demand and can be replenished as needed. The liquid column may be preconditioned (e.g., pH or alkalinity adjustment, filtering) before being recycled back through the oxygen processing unit where the liquid is replenished with oxygen. The liquid column in the vessel can also be replenished using an ongoing new supply of oxygen infused liquid (i.e., not recycled) as long as the excess is proportionately discharged where acceptable. The system and volume of oxidizing liquid should be sized adequately to match the volume of gas needing to be treated.

In some implementations, a method of treatment is to convey the contaminated or odorous gasses from the source via a gas conveyance system (for instance blowers and diffusers). The conveyance system pressurizes and diffuses the contaminated gasses through a column of the oxygen (or other treatment chemical) supersaturated liquid. The contaminated gasses are forced through the liquid column providing treatment via oxidation or other reactive process depending on the chemicals infused into the column of liquid. This allows contact time under pressure and accomplishes reduction and/or elimination of odorous constituents as the gas passes through the column.

Figure 5:
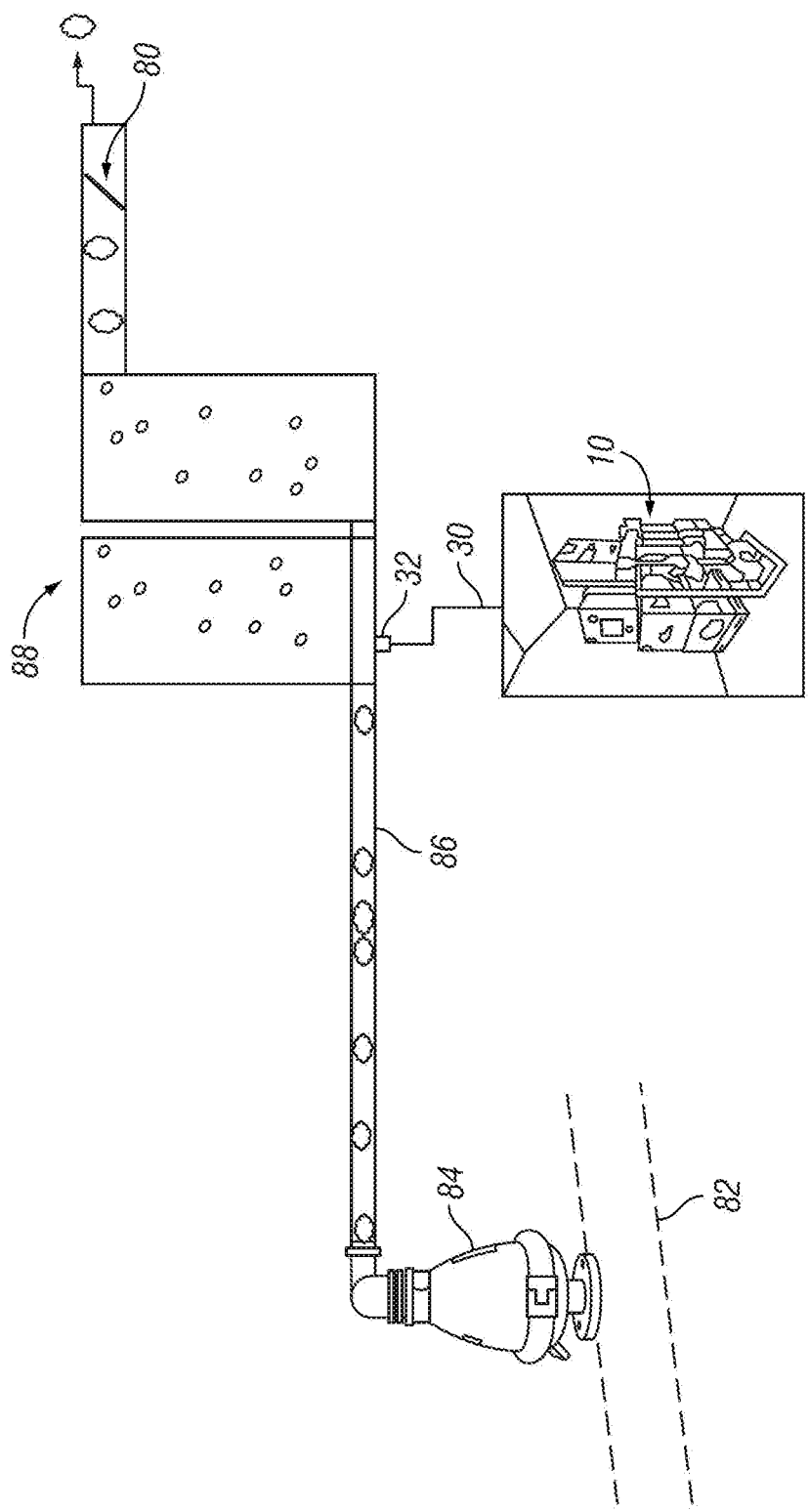
FIG. 5 is a schematic view of contaminated air from an Air Release Valve (ARV) treatment via an oxidizing, neutralizing, or treatment agent through a treatment chamber.

FIG. 5 is a schematic view of contaminated air from an Air Release Valve (ARV) treatment via an oxidizing, neutralizing, or treatment agent through a treatment chamber. In the system illustrated in FIG. 5, contaminated air in piping 82 is released periodically and randomly through Air Release Valve (ARV) 84 and the captured H2S gases are delivered through piping 86 to one or more treatment chambers 88. Oxygen infused liquid is generated at oxygen processing unit 10, and delivered by piping 30 to an atomization device 32 where it is atomized into the one or more treatment chambers 88. Throttling device 80, such as a valve, orifice, or other flow restricting device, may be used to control the chamber pressure in the treatment chambers 88 as appropriate. An ARV naturally releases gases under pressure and these gases can be treated passively through a treatment chamber as described above and/or as shown in FIG. 4.

Figure 6:
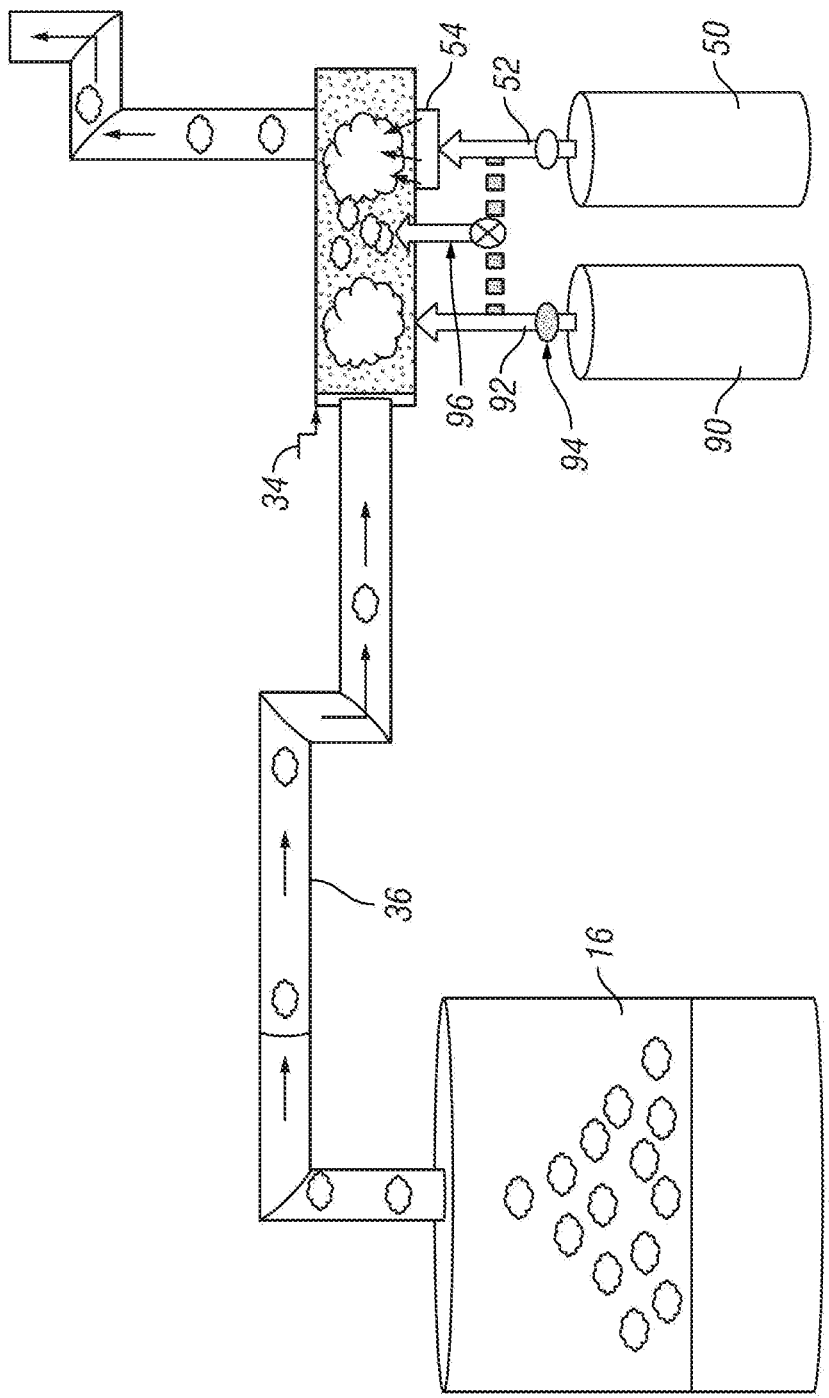
FIG. 6 is a schematic view of gas phase treatment via a treatment agent and liquid.

FIG. 6 is a schematic view of gas phase treatment via a treatment agent and liquid. In the system illustrated in FIG. 6, a gaseous treatment agent (e.g., oxygen, ozone, or other oxidizing agent) is generated at source 90, and delivered by piping 92 through regulator 94 to external chamber 34. Non-oxidizing liquid is provided from liquid supply 50 and delivered by piping 52 to an atomization device 54 where it is atomized into the external chamber 34 and mixes with the gaseous treatment agent to treat the headspace gasses passively delivered or fan induced from the wet well/basin 16 through piping 36. In some implementations, mixing connection 96 is installed between treatment agent source 90 and liquid supply 50 to enable mixing of the components prior to introduction into external chamber 34, as required.

Accordingly, in some implementations, a method for mitigation of H2S and other parameters in wastewater treatment may be characterized as a method for treating contaminated air from a wastewater treatment structure including delivering the contaminated air from the wastewater treatment structure to an interface including a liquid column; and delivering a treatment agent to the liquid column to treat the contaminated air.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A method for treating contaminated air from a wastewater treatment structure comprising:
   delivering the contaminated air from the wastewater treatment structure to an interface including a liquid column;
   delivering a treatment agent to the liquid column to treat the contaminated air; and
   treating the contaminated air with an oxidizing agent or treatment agent after exiting the liquid column.

2. The method of claim 1 further including treating the contaminated air from the wastewater treatment structure with an oxidizing agent or treatment agent prior to introduction into the liquid column.

3. The method of claim 1 wherein the treatment agent comprises oxygen, an oxygen infused liquid, chlorine, hypochlorite, peroxide, peat, charcoal, or histosol.

4. The method of claim 1 wherein the treatment agent is a liquid and is delivered to the interface through a nozzle.

5. The method of claim 1 wherein the treatment agent is a gas and is delivered to the interface through an atomization device.

6. The method of claim 1 wherein the contaminated air is delivered to the liquid column through a diffuser.

7. The method of claim 1 wherein the liquid column comprises an oxygen infused liquid.

8. The method of claim 1 wherein the contaminated air comprises H2S.

9. The method of claim 1 wherein the wastewater treatment structure comprises a wet well or basin.

10. The method of claim 1 further including controlling chamber pressure in the interface with a flow restriction device.

11. A method for treating contaminated air from a wastewater treatment structure comprising:
   delivering the contaminated air from the wastewater treatment structure to an interface including a liquid column;
   delivering a treatment agent to the liquid column to treat the contaminated air; and
   controlling chamber pressure in the interface with a flow restriction device.

12. The method of claim 11 further including treating the contaminated air from the wastewater treatment structure with an oxidizing agent or treatment agent prior to introduction into the liquid column.

13. The method of claim 11 further including treating the contaminated air from the wastewater treatment structure with an oxidizing agent or treatment agent after exiting the liquid column.

14. The method of claim 11 wherein the treatment agent comprises oxygen, an oxygen infused liquid, chlorine, hypochlorite, peroxide, peat, charcoal, or histosol.

15. The method of claim 11 wherein the treatment agent is a liquid and is delivered to the interface through a nozzle.

16. The method of claim 11 wherein the treatment agent is a gas and is delivered to the interface through an atomization device.

17. The method of claim 11 wherein the contaminated air is delivered to the liquid column through a diffuser.

18. The method of claim 11 wherein the liquid column comprises an oxygen infused liquid.

19. The method of claim 11 wherein the contaminated air comprises H2S.

20. The method of claim 11 wherein the wastewater treatment structure comprises a wet well or basin.

* * * * *